United States Patent
Shiobara et al.

(10) Patent No.: US 10,726,216 B2
(45) Date of Patent: Jul. 28, 2020

(54) INFORMATION PROCESSING DEVICE AND CONTROL METHOD FOR INFORMATION PROCESSING DEVICE

(71) Applicant: SHARP KABUSHIKI KAISHA, Sakai, Osaka (JP)

(72) Inventors: Naoki Shiobara, Sakai (JP); Masafumi Ueno, Sakai (JP); Masaaki Moriya, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/469,312

(22) PCT Filed: Dec. 4, 2017

(86) PCT No.: PCT/JP2017/043492
§ 371 (c)(1),
(2) Date: Jun. 13, 2019

(87) PCT Pub. No.: WO2018/110349
PCT Pub. Date: Jun. 21, 2018

(65) Prior Publication Data
US 2020/0104552 A1  Apr. 2, 2020

(30) Foreign Application Priority Data
Dec. 15, 2016 (JP) .................. 2016-243699

(51) Int. Cl.
*G06K 7/10* (2006.01)

(52) U.S. Cl.
CPC ..... *G06K 7/10297* (2013.01); *G06K 7/10316* (2013.01)

(58) Field of Classification Search
CPC .................................. G06K 7/10297
USPC ........................................ 235/451
See application file for complete search history.

(56) References Cited

U.S. PATENT DOCUMENTS

| 2014/0111486 A1* | 4/2014 | Zay | G06F 3/0488 345/178 |
| 2015/0161601 A1 | 6/2015 | Matsumoto et al. | |
| 2018/0107332 A1* | 4/2018 | Chan | G06F 3/0412 |
| 2019/0378252 A1* | 12/2019 | Yonaha | G06T 7/70 |

FOREIGN PATENT DOCUMENTS

| JP | 2005-063140 A | 3/2005 |
| JP | 2015-114789 A | 6/2015 |

* cited by examiner

*Primary Examiner* — Allyson N Trail
(74) *Attorney, Agent, or Firm* — ScienBiziP, P.C.

(57) ABSTRACT

A user is guided with a simple configuration so that near field communication is performed. An information processing device (1) includes an NFC antenna (520) configured to perform near field communication with an NFC terminal (100), and a display unit (53) configured to display a guide region (Ai). The guide region (Ai) serves as a guide for a communication-enabling region. The display unit (53) displays the guide region (Ai) such that the guide region (Ai) is included in the communication-enabling region (B) and the guide region (Ai) is smaller than the communication-enabling region (B).

4 Claims, 6 Drawing Sheets

INFORMATION PROCESSING DEVICE AND CONTROL METHOD FOR INFORMATION PROCESSING DEVICE

TECHNICAL FIELD

The following disclosure relates to, for example, an information processing device that performs near field communication with information-communication terminals.

BACKGROUND ART

In recent years, a variety of techniques related to near field communication have been proposed. For example, PTL 1 discloses a technique for enabling a user to more reliably perform communication (specifically, transmission and reception of data) between a radio frequency identification (RFID) reader-writer and an integrated circuit (IC) tag.

Specifically, the technique disclosed in PTL 1 aims to maintain the positional relationship with which the RFID reader-writer and the IC tag are able to appropriately perform communication. According to the technique disclosed in PTL 1, at least one of the housing of the RFID reader-writer and the housing of the IC tag is provided with a convex shape or a concave shape. Physically engaging the RFID reader-writer with the IC tag by using such shape maintains the above-described positional relationship.

CITATION LIST

Patent Literature

PTL 1: Japanese Unexamined Patent Application Publication No. 2005-63140 (published on Mar. 10, 2005).

SUMMARY OF INVENTION

Technical Problem

According to the technique disclosed in PTL 1, however, to provide the convex or concave shape, at least one of the housing of the RFID reader-writer and the housing of the IC tag is required to undergo machining.

An aspect of the present disclosure is made in view of the problem described above and aims to guide, with a simple configuration, a user so that near field communication is performed.

Solution to Problem

To solve the problem described above, an information processing device according to an aspect of the present disclosure includes: an antenna configured to perform near field communication with an information-communication terminal; and a display unit disposed so as to overlap the antenna. The display unit is configured to display a guide region. The guide region serves as a guide for a reception-enabling region. The reception-enabling region corresponds to a region where the antenna is able to receive a signal from the information-communication terminal. The display unit is further configured to display the guide region such that the guide region is included in the reception-enabling region and the guide region is smaller than the reception-enabling region.

Moreover, to solve the problem described above, a control method for an information processing device according to the aspect of the present disclosure is a method for controlling an information processing device including: an antenna configured to perform near field communication with an information-communication terminal; and a display unit disposed so as to overlap the antenna. The display unit is configured to display a guide region. The guide region serves as a guide for a reception-enabling region. The reception-enabling region corresponds to a region where the antenna is able to receive a signal from the information-communication terminal. The control method includes a guide-region display step of displaying the guide region on the display unit such that the guide region is included in the reception-enabling region and the guide region is smaller than the reception-enabling region.

Advantageous Effects of Invention

The information processing device and the control method therefor according to the aspects of the present disclosure provide an effect that a user is guided with a simple configuration so that near field communication is performed.

BRIEF DESCRIPTION OF DRAWINGS

FIG. 3(*a*) illustrates both a guide region displayed on the display device and an error region, and FIG. 3(*b*) illustrates a communication-enabling region in the display device.

DESCRIPTION OF EMBODIMENTS

Embodiment 1

Embodiment 1 of the present disclosure will hereinafter be described in detail with reference to FIGS. 1 to 5. It should be noted that, in the present embodiment, the term "near field communication" encompasses all types of wireless communication having short-reach distances. Near field communication includes communication that employs a radio frequency identification (RFID) technique such as non-contact integrated circuit (IC) cards and non-contact IC tags.

In the present embodiment, unless expressly specified, it may be understood that, in a case where the term "communication" is simply used, the term "communication" means near field communication. In the following embodiments, descriptions will be made with near field communication (NFC) being presented as an example of wireless communication having short-reach distances.

Information Processing Device 1

Figure 1:
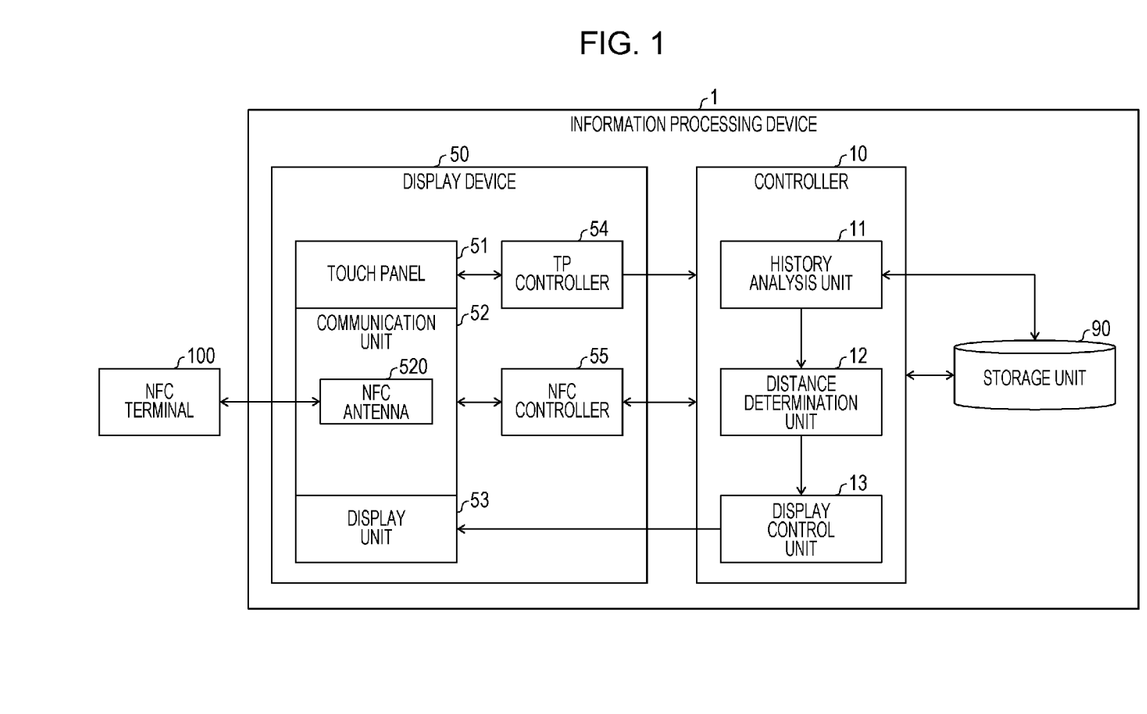
FIG. 1 is a function block diagram illustrating a configuration of main parts of an information processing device according to Embodiment 1.

First, an overview of an information processing device 1 according to the present embodiment will be described. FIG. 1 is a function block diagram illustrating the configuration of main parts of the information processing device 1 according to the present embodiment. The information processing device 1 is a device configured to perform communication with an NFC terminal 100 (information-communication terminal). The information processing device 1 includes a controller 10, a display device 50, and a storage unit 90.

The controller 10 controls the respective components of the information processing device 1 collectively. The functions of the controller 10 may be realized by a process in which a central processing unit (CPU) runs a program stored in the storage unit 90. Specific operation of the controller 10 will be described later. The storage unit 90 stores both various programs run by the controller 10 and data used by the programs.

The display device 50 is provided with a function for communicating with the NFC terminal 100. As will be described below, the information processing device 1 performs communication with the NFC terminal 100 through the NFC antenna 520 (antenna) of the display device 50.

Here, various pieces of information unique to the information-communication terminal (NFC terminal 100), which is imparted in advance, are collectively referred to as terminal information. The terminal information may include information such as (i) a terminal ID that is the unique identification number of an information-communication terminal, (ii) terminal type information indicating the type of the information-communication terminal, and (iii) a user ID that is the identification number of the user (the owner) of the information-communication terminal.

It should be noted that it is sufficient for an NFC terminal 100 to be able to perform the communication with the NFC antenna 520. The type of the NFC terminal 100 is not limited to a specific type. For example, the NFC terminal 100 may be (i) an NFC card, (ii) an object to which an NFC tag is attached, or (iii) a portable terminal that has an NFC communication function. Such a portable terminal is sometimes referred to as an NFC-equipped mobile terminal.

Figure 2:
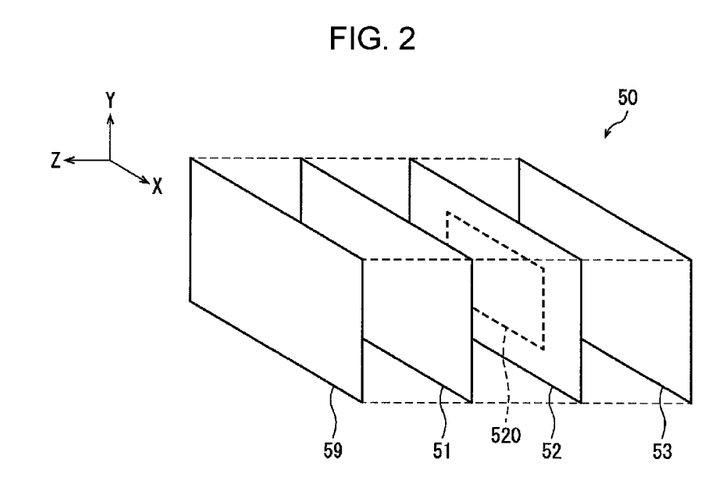
FIG. 2 illustrates a configuration of a display device of the information processing device illustrated in FIG. 1.
Figure 3:
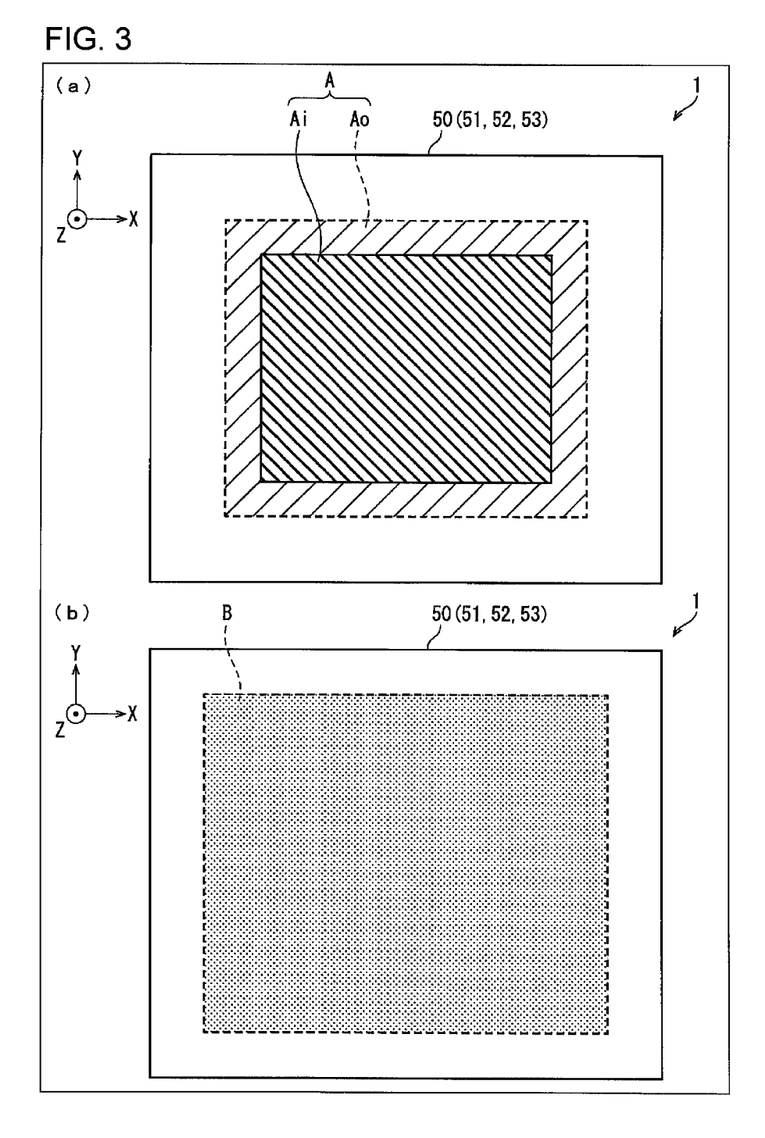

FIG. 2 illustrates a configuration of the display device 50. The display device 50 is integrally composed of, in order from the side from which a user views images, a protective glass sheet 59, a touch panel 51, a communication unit 52 (an NFC antenna layer), and a display unit 53 (a display screen) such that these components overlap one another. In addition, as illustrated in FIG. 1, the display device 50 further includes a touch panel (TP) controller 54 and an NFC controller 55. Note that the TP controller 54 and the NFC controller 55 are not illustrated in FIG. 2 for simplicity. It should be noted that the touch panel 51 and the TP controller 54 are not essential components for the information processing device 1 and may be omitted.

In FIG. 2, a direction orthogonal to the display unit 53 (in other words, the display screen of the display device 50) is referred to as a Z direction. The positive direction of the Z direction is defined as a direction from the display unit 53 toward the protective glass sheet 59, in other words, a direction toward the user. In addition, two directions orthogonal to the Z direction are individually referred to as an X direction and a Y direction. In the present embodiment, a side (for example, the longer side) of the display unit 53 is defined as the X direction. Another side (for example, the shorter side), orthogonal to the X direction, of the display unit 53 is defined as the Y direction. In the following, descriptions will be made using the X-Y-Z orthogonal coordinate system.

The touch panel 51 may be composed of an electrostatic capacitive touch panel. The touch panel 51 detects contact or proximity of an object with respect to the touch panel 51. In addition, the touch panel 51 further detects the position on the touch panel 51 where the object is in contact or in proximity with the touch panel 51. The touch panel 51 functions as a position sensor for detecting the position of an NFC terminal 100 placed on or over the display unit 53. In the present embodiment, a case where the touch panel 51 detects proximity of the NFC terminal 100 will be described as an example.

In addition, the touch panel 51 further functions as an input unit through which the user performs an input operation to the information processing device 1 by using, for example, their finger. In the touch panel 51, a surface facing the user is protected by the protective glass sheet 59.

Furthermore, the object-detecting method employed in the touch panel 51 is not limited to the electrostatic capacitive system. For example, a touch panel employing a resistive film system or an ultrasonic system may be used instead of the touch panel 51 employing the electrostatic capacitive system. In addition, another type of position sensor may be used instead of the touch panel 51. It is sufficient for the position sensor to be a sensor that is able to detect contact or proximity of an object and the position of the object. For example, an infrared sensor, a pressure-sensitive sensor, or an illuminance sensor may be used as the position sensor.

The TP controller 54 collectively controls operation of the touch panel 51. Specifically, the TP controller 54 determines the position on the touch panel 51 where the object (for example, an NFC terminal 100) is in proximity to the touch panel 51. Next, the TP controller 54 sends position information indicating the position to the controller 10.

The communication unit 52 is a communication device that enables the information processing device 1 to perform communication with an NFC terminal 100. More specifically, the communication unit 52 is a sheet-like member provided between the touch panel 51 and the display unit 53. The communication unit 52 may be composed of a sheet antenna (an antenna module) including one or more NFC antennas 520. In the present embodiment, a case where the number of NFC antennas 520 is one will be described as an example.

The NFC antenna 520 is formed internally in the communication unit 52. The communication unit 52 serves as a protective member for protecting (covering) the NFC antenna 520. The NFC antenna 520 performs communication with the NFC terminal 100 through the NFC.

It should be noted that, to ensure that visibility is not hindered in a case where the user views an image displayed on the display unit 53, it is preferable that the communication unit 52 and the NFC antenna 520 have high transparency. Thus, it is preferable that a known transparent NFC antenna sheet be used as the communication unit 52. In other words, it is preferable that the NFC antenna 520 be formed as a transparent antenna. Although the NFC antenna 520 is depicted by a broken line for convenience of explanation in, for example, FIG. 2, it should be noted that the NFC antenna 520 is, in fact, almost transparent and does not hinder visibility for the user.

The NFC controller 55 is a component configured to control operation of the NFC antenna 520. The NFC controller 55 controls the driving of the NFC antenna 520 in accordance with controlling signals from the controller 10, which will be described later. In addition, the NFC controller 55 is able to perform a process of transmitting information or a process of receiving information between the NFC antenna 520 and the NFC terminal 100 over a period during which the NFC antenna 520 is being driven.

The display unit 53 is a device for displaying a guide region. The guide region serves as a guide for a communication-enabling region (reception-enabling region). Here, the communication-enabling region corresponds to a region where the NFC antenna 520 is able to receive a signal from the NFC terminal 100. The shape of the communication-enabling region is set on the basis of, for example, the shape of the NFC antenna 520 or electric power supplied to the NFC antenna 520 by the NFC controller 55. Specifically, the shape of the communication-enabling region is similar to the shape of the NFC antenna 520. In addition, the communication-enabling region having the shape described above is present on the surface of the display unit 53 only over a period during which electric power is being supplied to the NFC antenna 520, while the communication-enabling region is not present over a period during which no electric power is supplied to the NFC antenna 520. The display unit 53 displays other information such as communication contents between the NFC antenna 520 and the NFC terminal 100. The display unit 53 may be composed of, for example, a liquid crystal display. As described above, the display unit 53 is disposed so as to overlap the NFC antenna 520. In addition, the display region of the display unit 53, which corresponds to a region that is able to display images, includes the communication-enabling region and has an area greater than or equal to the area of the communication-enabling region.

FIG. 3(a) illustrates a guide region Ai displayed on the display device 50 and an error region Ao. Here, the error region Ao corresponds to a region that is provided around the guide region Ai (in other words, on the outer periphery of the guide region Ai) and in which the communication between the NFC antenna 520 and the NFC terminal 100 is able to be performed. Furthermore, FIG. 3(b) illustrates the communication-enabling region B in the display device 50. Although, in FIGS. 3(a) and 3(b), the guide region Ai and the communication-enabling region B are depicted in the respective different figures for convenience of explanation, it should be noted that, in fact, the guide region Ai overlaps the communication-enabling region B. Furthermore, the error region Ao is depicted by a broken line in FIG. 3(a) and the communication-enabling region B is depicted by a broken line in FIG. 3(b) for convenience of explanation. However, neither the error region Ao nor the communication-enabling region B is, in fact, displayed on the display unit 53.

As illustrated in FIG. 3(a), the guide region Ai appears on the display unit 53 of the display device 50. The guide region Ai is included in the communication-enabling region B illustrated in FIG. 3(b). In addition, the guide region Ai is smaller than the communication-enabling region B. In other words, the display unit 53 displays the guide region Ai such that the guide region Ai is included in the communication-enabling region B and such that the guide region Ai is smaller than the communication-enabling region B. The user places an NFC terminal 100 in the guide region Ai, which causes communication to be performed between the NFC terminal 100 and the NFC antenna 520.

Depending on, for example, an operation by the user, it is possible that not all portions of an NFC terminal 100 are placed inside the guide region Ai and a portion of the NFC terminal 100 is placed outside the guide region Ai. The error region Ao is provided around the guide region Ai so that communication between the NFC terminal 100 and the NFC antenna 520 is stably performed, even in such a case.

The error region Ao is also included in the communication-enabling region B and is smaller than the communication-enabling region B. Accordingly, in practice, communication between the NFC terminal 100 and the NFC antenna 520 is enabled by the user placing the NFC terminal 100 in a communication-accepting region A in which the guide region Ai and the error region Ao are combined.

Controller 10

Referring back to FIG. 1, the controller 10 and a control method performed by the controller 10 will be described. As illustrated in FIG. 1, the controller 10 includes a history analysis unit 11, a distance determination unit 12, and a display control unit 13.

On the basis of history that includes the types of NFC terminals 100 that have performed communication with the NFC antenna 520, the history analysis unit 11 calculates an occurrence rate of communication associated with each of the types. The NFC terminal 100 type is determined by acquiring the above-described terminal type information through communication between the NFC terminal 100 and the NFC antenna 520. The history to be used in the calculation is stored in the storage unit 90. The history mentioned here may correspond either to history that covers a particular period in the past or to history that covers a period from a particular time in the past to the present time (the time when the NFC antenna 520 and an NFC terminal 100 perform communication). Alternatively, the history analysis unit 11 may be a unit that is configured to estimate occurrence rates of communication instead of a unit that is configured to calculate occurrence rates of communication on the basis of history acquired by using the information processing device 1.

The distance determination unit 12 determines the distance D1 between the outer edge of the communication-enabling region B and the outer edge of the guide region Ai on the basis of the types of the NFC terminals 100 which have performed communication with the NFC antenna 520. In the present embodiment, the distance determination unit 12 determines the distance D1 between the outer edge of the communication-enabling region B and the outer edge of the guide region Ai on the basis of history that includes: the type of the particular NFC terminal 100 with which the NFC antenna 520 has performed near field communication; and the occurrence rate at which the NFC antenna 520 has performed the near field communication with the particular NFC terminal 100. Fundamentally, the distance determination unit 12 determines the distance D1 on the basis of history that includes: the size of the particular NFC terminal 100 with which the NFC antenna 520 has performed near field communication; and the occurrence rate at which the NFC antenna 520 has performed the near field communication with the particular NFC terminal 100. The lower limit of the distance D1 may have any value as long as the value is larger than zero. With the lower limit of the distance D1 being larger than zero, the guide region Ai is included in the communication-enabling region B and the guide region Ai is smaller than the communication-enabling region B.

However, to enable stable communication between an NFC terminal 100 and the NFC antenna 520, it is preferable that, as described above, the communication-accepting region A, which includes the error region Ao provided around the guide region Ai, be included in the communication-enabling region B. Therefore, the distance determination unit 12 according to the present embodiment sets the distance D1 to a value greater than or equal to a predetermined lower limit.

In the present embodiment, the predetermined lower limit of the distance D1 is determined on the basis of the size of an NFC terminal 100. In the present embodiment, data for establishing correspondence between the type and size of NFC terminals 100 is stored in the storage unit 90 in advance. Referring to the data, the distance determination unit 12 determines the size of an NFC terminal 100 on the basis of the type of the NFC terminal 100.

It should be noted that, in the information processing device 1, the data described above is not limited to being stored in the storage unit 90. In that case, the information processing device 1 may detect the size of an NFC terminal 100 by using, for example, the touch panel 51.

In the present embodiment, the distance determination unit 12 determines the distance D1 on the basis of the occurrence rate of communication, which the history analysis unit 11 has calculated, of each type of NFC terminal 100. Alternatively, the distance determination unit 12 may determine the distance D1 on the basis of the length of an NFC terminal 100.

Depending on the application of the information processing device 1, the type of an NFC terminal 100 that performs communication with the NFC antenna 520 is limited, for example, as follows: in a case where the information processing device 1 is a device for payment, the NFC terminal 100 is limited to an NFC terminal (an NFC card) having a function of electronic money; and in a case where the information processing device 1 is a device for transmitting information, the NFC terminal 100 is limited to a portable information terminal adapted for the transmission of information.

With the type of the NFC terminal 100 limited, the size and the shape of the NFC terminal 100 are also limited.

Figure 4:
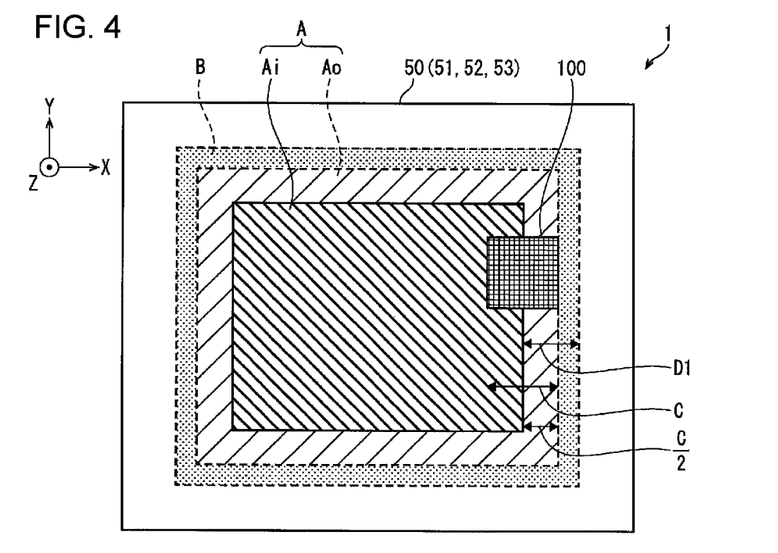
FIG. 4 illustrates a state in which a near field communication (NFC) terminal is placed on the display device, in which the display device is in a condition where the guide region is displayed on a display unit.

For example, consider a case where, for the application of the information processing device 1, NFC terminals 100 of two sizes are used. In this case, using the following formula, the distance determination unit 12 gives each size of NFC terminal 100 a corresponding weighting on the basis of an occurrence rate of communication so as to calculate an average value C of the length of the NFC terminals 100.

$$C=(x \times \alpha + y \times \beta)/(\alpha+\beta)$$

in the above formula, x and y represent the lengths of the respective two sizes of NFC terminals 100. For example, in a case where an NFC terminal 100 is a square as illustrated in FIG. 4, the length of the NFC terminal 100 is equal to the length of a side of the square. As another example, in a case where an NFC terminal 100 is a circle, the length of the NFC terminal 100 is equal to the diameter of the circle. Further, $\alpha$ and $\beta$ represent the number of communication actions performed by the respective two sizes of NFC terminals 100 in a predetermined period, $\alpha/(\alpha+\beta)$ and $\beta/(\alpha+\beta)$ obtained by developing the formula represent the occurrence rates of communication of the respective NFC terminals 100. It should be noted that also in a case where, for the application of the information processing device 1, NFC terminals 100 of three or more sizes are to be used, the distance determination unit 12 performs the weighting on the basis of the number of communication actions of each NFC terminal 100 so as to calculate an average value C of length.

The distance determination unit 12 determines the distance D1 on the basis of the average value C, calculated as described above, of the length of NFC terminals 100. The distance D1 is determined so that the error region Ao is included in the communication-enabling region B.

For example, in a case where an acceptable margin for error is set to half (½) the average value C of the length of the NFC terminals 100, the distance determination unit 12 may set the distance D1 to half the average value C as well. As described above, this value is equivalent to the lower limit of the distance D1, in other words, the value of the distance D1 that causes the guide region Ai to have the largest area. The distance determination unit 12 may also set the distance D1 to any value greater than or equal to half the average value C.

As another example, the acceptable margin for error may be set to a value that is not equal to half the average value C of the length of the NFC terminals 100. In this case, the distance determination unit 12 determines the distance D1 on the basis of the acceptable margin for error. In a case where, for example, the acceptable margin for error is set to a quarter of the average value C of the length of the NFC terminals 100, the distance determination unit 12 sets the distance D1 to any value greater than or equal to a quarter of the average value C.

The display control unit 13 displays the guide region Ai on the display unit 53 such that the guide region Ai is included in the communication-enabling region B and such that the guide region Ai is smaller than the communication-enabling region B (a guide-region display step). At this time, the display control unit 13 sets the distance between the outer edge of the guide region Ai and the outer edge of the communication-enabling region B to the distance D1 determined by the distance determination unit 12.

In the history described above, it is possible that at least one type of NFC terminal 100 of plural types of NFC terminals 100 has unequal lengths, namely that the type of NFC terminal 100 has a long axis and a short axis. Here, in a case where, for example, an NFC terminal 100 is rectangular, the long axis corresponds to an axis parallel to the longer side, and the short axis corresponds to an axis parallel to the shorter side. As another example, in a case where an NFC terminal 100 is an ellipse, the long axis and the short axis respectively correspond to the major axis and the minor axis of the ellipse. In such cases, the length of the particular type of NFC terminal 100, specifically, the length being used in the calculation of the average value C, may be set to the length of the long axis or to the length of the short axis. Alternatively, the length of the particular type of NFC terminal 100 may be set to an average value of the length of the long axis and the length of the short axis.

It should be noted that the above-described method for calculating the average value C is given for mere illustration. Another calculation method may be employed depending on situation. In a case where, for example, the occurrence rate of communication of a particular type of NFC terminal 100 is very low compared with the occurrence rate of communication of another type of NFC terminal 100, the distance determination unit 12 may exclude the particular type of NFC terminal 100 from the history so as to remove an outlier. Then, the distance determination unit 12 may calculate a weighted average value.

As another example, also in a case where the size of a particular type of NFC terminal 100 is very large or very small compared with the size of other types of NFC terminals 100, the distance determination unit 12 may exclude the particular type of NFC terminal 100 from the history. Then, the distance determination unit 12 may calculate a weighted average value. In this case, the manufacturer of the information processing device 1 may appropriately determine the specific size of an NFC terminal 100 that will be excluded from the history.

The NFC terminal 100 in each example described above is rectangular. The NFC terminal 100, however, may be, for example, circular or a polygonal shape other than rectangular. In this case, for the NFC terminal 100, the distance determination unit 12 may set, for example, (i) an axis serving as a reference and (ii) any number of axes tilted at any angle with respect to this axis. Then, the distance determination unit 12 may set the length of the NFC terminal 100 to an average value of the lengths of the NFC terminal 100 measured in the directions of the respective axes.

For example, in a case where an NFC terminal 100 is triangular, (i) a first axis parallel to a side, (ii) a second axis rotated by 60 degrees with respect to the first axis, and (iii) a third axis rotated by 120 degrees with respect to the first axis may be set. Then, the length of the NFC terminal 100 may be set to an average value of the lengths of the NFC terminal 100 measured in the directions of the respective axes. As another example, in the case where the NFC terminal 100 is triangular, axes may be set, specifically, each of the axes being parallel to the corresponding side of the three sides.

The communication-enabling region B and the guide region Ai are rectangular in each example described above. However, depending on, for example, the shape of the NFC antenna 520, a case is possible where the shape of the communication-enabling region B is not rectangular. In this case, the shape of the guide region Ai may also be appropriately modified in accordance with the shape of the communication-enabling region B.

In each example described above, the distance determination unit 12 determines the distance D1 between the outer edge of the communication-enabling region B and the outer edge of the guide region Ai on the basis of the occurrence rate of communication, which the history analysis unit 11 has calculated, of each type of NFC terminal 100. However, depending on the usage of the information processing device 1, a case is possible where NFC terminals 100 that are assumed to perform communication with the NFC antenna 520 are of one type alone. In this case, the controller 10 of the information processing device 1 does not need to include the history analysis unit 11. In this case, the distance determination unit 12 determines the distance D1 on the basis of the size of the one type of NFC terminal 100.

In addition, in each example described above, although the distance determination unit 12 determines the distance D1 between the outer edge of the communication-enabling region B and the outer edge of the guide region Ai, the information processing device 1 is not necessarily provided with the distance determination unit 12. For example, the storage unit 90 may store, in advance, the value of a distance D1 that does not depend on, for example, the history of each type of NFC terminal 100, and the display control unit 13 may cause the display unit 53 to display a guide region Ai in accordance with the value of the distance D1. Alternatively, the storage unit 90 may store, in advance, the value of a distance D1 that the designer of the information processing device 1 has determined on the basis of the type of an NFC terminal 100 that is assumed to perform communication with the NFC antenna 520, and the display control unit 13 may cause the display unit 53 to display a guide region: Ai in accordance with the value of the distance D1.

In addition, the distance determination unit 12 does not necessarily need to determine a distance D1 on the basis of the occurrence rates described above. For example, the distance determination unit 12 may determine the distance D1 on the basis of only the type of NFC terminal 100 that has performed communication with the NFC antenna 520 immediately before.

FIG. 4 illustrates the state in which an NFC terminal 100 is placed on the display device 50 in a condition where the guide region Ai is displayed on the display unit 53. The error region Ao and the communication-enabling region B, which are not displayed on the display unit 53, are additionally depicted in FIG. 4 for convenience of explanation.

When a user uses the information processing device 1, the user places an NFC terminal 100 in the guide region Ai. Consider a case where, at this time, the NFC terminal 100 is placed such that the NFC terminal 100 is positioned C/2 outside the guide region Ai, assuming that the length of the NFC terminal 100 measured along the short axis is C. In this case, as illustrated in FIG. 4, the outer edge of the NFC terminal 100 is in contact with the outer edge of the error region Ao. Since the error region Ao is included in the communication-enabling region B, all portions of the NFC terminal 100 lie inside the communication-enabling region B.

Accordingly, in a case where the NFC terminal 100 is placed inside the guide region Ai or inside a region that has an error of C/2 with respect to the guide region Ai, communication is enabled between the NFC antenna 520 and the NFC terminal 100.

Effects of Information Processing Device 1

In the information processing device 1, the display unit 53 displays the guide region Ai such that the guide region Ai is included in the communication-enabling region B and is smaller than the communication-enabling region B. Using the guide region Ai as a guide, the user of the information processing device 1 places the NFC terminal 100 on the display unit 53 so as to place the NFC terminal 100 inside the communication-enabling region B. As a result, communication is performed between the NFC antenna 520 and the NFC terminal 100. Accordingly, the information processing device 1 is able to guide, with a simple configuration, the user so that near field communication is performed.

In addition, in the information processing device 1, determining the distance D1 between the outer edge of the communication-enabling region B and the outer edge of the guide region Ai on the basis of the size of the NFC terminal 100, particularly, on the basis of the length of the NFC terminal 100, leads to the appropriate determination of the distance D1.

In the information processing device 1, in a case where the distance D1 is equal to half the length of the long axis or to half the length of the short axis of an NFC terminal 100, when a half portion of the NFC terminal 100 is placed in a region outside the guide region Ai, near field communication is able to be performed between the NFC terminal 100 and the NFC antenna 520.

In addition, the information processing device 1 includes the distance determination unit 12 configured to determine the distance D1 on the basis of the type of the NFC terminal 100. Each type of NFC terminal 100 typically has the unique size of the NFC terminal 100. Accordingly, the information processing device 1 does not need to determine the size of an NFC terminal 100.

In addition, in the information processing device 1, the distance determination unit 12 determines the distance D1 on the basis of history that includes: the type of the NFC terminal 100 with which the NFC antenna 520 has performed communication; and the occurrence rate at which the NFC terminal 100 and the NFC antenna 520 have performed the communication. Accordingly, even if NFC terminals 100 that perform communication with the NFC antenna 520 are of plural types, the distance D1 is appropriately determined on the basis of the occurrence rates described above.

Modification 1

Figure 5:
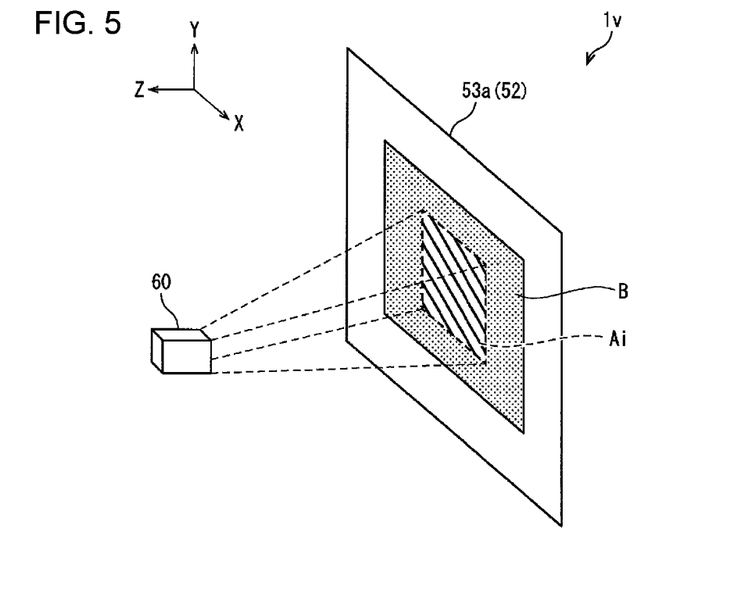
FIG. 5 illustrates an information processing device according to Modification 1 of Embodiment 1.

FIG. 5 illustrates an information processing device 1v according to Modification 1 of the present embodiment. The information processing device 1v is different from the information processing device 1 in the following: a projector 60 is further provided; and a display unit 53a is provided instead of the display unit 53. The projector 60 projects (displays) a guide region Ai on the display unit 53a (on the communication unit 52). The display unit 53a corresponds to a surface of the communication unit 52, specifically, the surface facing the projector 60.

The information processing device 1v described above is also included in the variations of the information processing device 1 of the present embodiment. It should be noted that, in the information processing device 1v, the communication unit 52 does not need to have transparency.

Modification 2

In a case where NFC terminals 100 have long axes and short axes and where a direction along which the NFC terminals 100 are placed on the display device 50 is predetermined, the distance determination unit 12 may separately calculate an average value C of the length of the NFC terminals 100 measured in the X direction and an average value C of the length of the NFC terminals 100 measured in the Y direction in accordance with the above-described direction. In this case, a distance D1 in the X direction and a distance D1 in the Y direction also have different values in accordance with the calculated average values C.

As another example, in a case where the history described above includes information on orientations of NFC terminals 100, the history analysis unit 11 may calculate the occurrence rates of communication in which the orientations are taken into account. For example, for an NFC terminal 100 that has a long axis and a short axis, (i) an occurrence rate of communication associated with a condition where the long axis is oriented along the X direction and (ii) an occurrence rate of communication associated with a condition where the long axis is oriented along the Y direction may be separately calculated. In this case, the distance determination unit 12 calculates the above-described average values C on the basis of the occurrence rates of communication in which the orientations are taken into account. For preparing the history that includes the information on the orientations of NEC terminals 100, the orientation of an NEC terminal 100 may be determined with a detector such as the touch panel 51. It should be noted that, for NEC terminals 100 having long axes and short axes, occurrence rates of communication may be calculated with respect to any directions other than the directions corresponding to the respective cases (i) and (ii) described above, and the average values C may then be calculated.

As another example, in a case: where the length of an NFC terminal 100, which is not limited to a device having a long axis and a short axis, measured in the X direction (or in the Y direction) at the time when the NFC terminal 100 is placed on the display device 50 differs depending on the orientation; and where there is a plurality of possible orientations of the NFC terminal 100 at the time when communication is performed, the length of the NFC terminal 100 may be set to an average value of lengths that are measured in the respective possible directions. Here, the average value described above may be a simple average or an average obtained by performing weighting on the basis of, for example, an occurrence rate of communication associated with each orientation of the NFC terminal 100. Alternatively, the length of the NFC terminal 100 may be set to the maximum of or to the minimum of the lengths of the NFC terminal 100 measured in the respective possible directions.

As another example, in a case where plural types of NFC terminals 100 that will be placed on the display device 50 and that have different sizes (and different shapes) are possible, lengths of the plural types of NFC terminals 100 measured in the X direction (or in the Y direction) may be averaged to provide a length in the X direction (or in the Y direction) for the calculation of the distance D1. At this time, the above-described length of each of the NFC terminals 100 may be given a corresponding weighting on the basis of the occurrence rate of communication of the corresponding type of the NFC terminal 100. Alternatively, the maximum or the minimum of the lengths of the plural types of NFC terminals 100 measured in the X direction (or in the Y direction) may be chosen as the length of NFC terminal 100 for the calculation of the distance D1.

Furthermore, it is possible that a correlation is found between the position, in the guide region Ai, at which an NFC terminal 100 is placed and the orientation of the NFC terminal 100. In this case, for each position described above, the history analysis unit 11 may calculate the occurrence rate of communication in which the orientation is taken into account.

Embodiment 2

Descriptions of Embodiment 2 of the present disclosure with reference to FIG. 6 will be as follows. It should be noted that a member having the same function as the function of a member described in the above-described embodiment will be denoted by the same reference character and that a description of the member will be omitted for convenience of explanation.

In the information processing device 1 of Embodiment 1, the distance determination unit 12 determines the lower limit of the distance D1 on the basis of the occurrence rate of communication of each type of NFC terminal 100.

Depending on, for example, the kind of content that the information processing device 1 runs, a case is possible where it is desired to display the guide region Ai smaller. In this case, the distance determination unit 12 sets the distance D1 to any value greater than or equal to the above-described lower limit so that the guide region Ai is displayed smaller.

An increase in the distance D1, however, leads to an expansion of a region that is a portion of the communication-enabling region B and that is not included in the guide region Ai. As a result, when a user places an NFC terminal 100 in a region other than the guide region Ai, unintended communication might be performed between the NFC terminal 100 and the NFC antenna 520.

In view of what described above, the distance determination unit 12 further determines the upper limit of the distance D1 in the present embodiment. The upper limit of the distance D1 is determined on the basis of the length of the long axis or of the length of the short axis of an NFC terminal 100. For example, the upper limit may be equivalent to the length of the long axis or to the length of the short axis of the NFC terminal 100.

Moreover, in a case where NFC terminals 100 that have performed communication with the NFC antenna 520 are of plural types, the distance determination unit 12 may obtain an average value C of the length of the NFC terminals 100 in the same way as in Embodiment 1 so as to determine the upper limit of the distance D1 on the basis of the average value C. In this case, the upper limit may be equivalent to, for example, the average value C.

Figure 6:
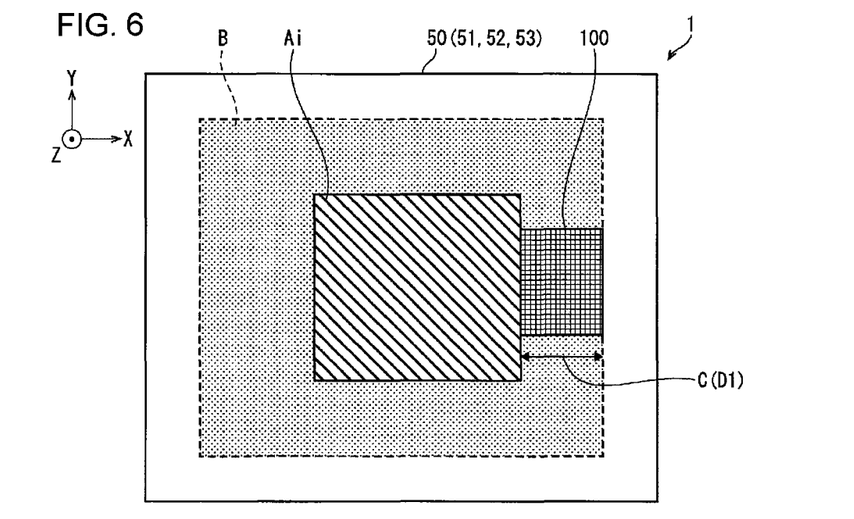
FIG. 6 illustrates a guide region and a communication-enabling region according to Embodiment 2 in a condition where a distance between an outer edge of the communication-enabling region and an outer edge of the guide region is set to the upper limit thereof.

FIG. 6 illustrates a guide region Ai and a communication-enabling region B with the upper limit according to the present embodiment. In FIG. 6, the upper limit is equal to the average value C of the length of the NFC terminals 100. In this case, as illustrated in FIG. 6, placing the NFC terminal 100 such that, in a region outside the guide region Ai, the NFC terminal 100 comes into contact with the outer edge of the guide region Ai sets the NFC terminal 100 into a condition where the NFC terminal 100 is placed such that, in a region inside the communication-enabling region B, the NFC terminal 100 comes into contact with the outer edge of the communication-enabling region B. In other words, placing the NFC terminal 100 in a region outside the guide region Ai such that the NFC terminal 100 does not come into contact with the outer edge of the guide region Ai results in a state where at least a portion of the NFC terminal 100 lies outside the communication-enabling region B.

Consequently, in the example described above, when all portions of the NFC terminal 100 are placed outside the guide region Ai, no communication is performed between the NFC terminal 100 and the NFC antenna 520. As a result, a risk is reduced that communication a user does not intend to perform is performed between the NFC terminal 100 and the NFC antenna 520. It should be noted that the upper limit is not limited to any one of the length of the long axis of the NFC terminal 100, the length of the short axis of the NFC terminal 100, and the average value C of the length and that the upper limit may be set to any length based on any one of the length of the long axis of the NFC terminal 100, the length of the short axis of the NFC terminal 100, and the average value C of the length.

The information processing device 1 may appropriately choose the distance D1 to be in a range of the lower limit described in Embodiment 1 to the upper limit described in the present embodiment, in accordance with, for example, the application of the device. The appropriate determination of the distance D1 enables the information processing device 1 to display, on the display device 50, a guide region Ai having an appropriate range.

Embodiment 3

Descriptions of Embodiment 3 of the present disclosure with reference to FIG. 7 will be as follows.

Figure 7:
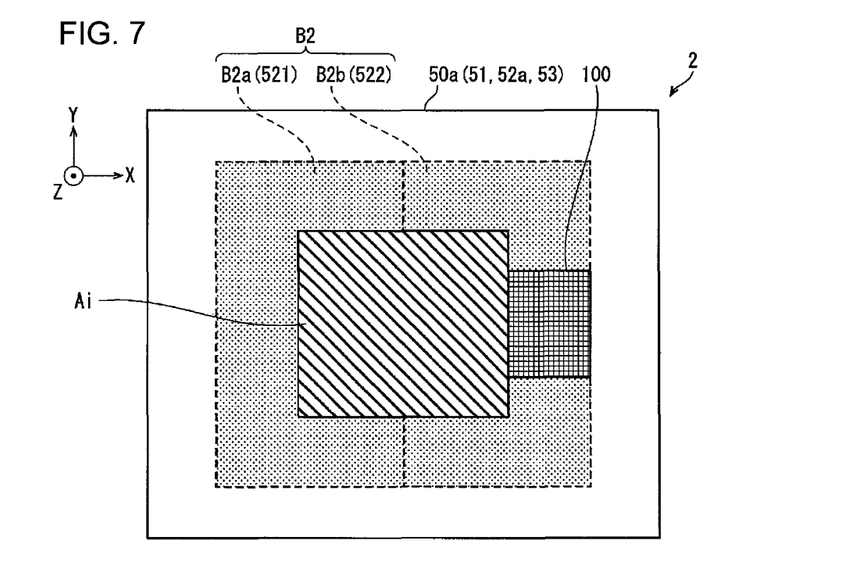
FIG. 7 illustrates a state in which an NFC terminal is placed on an information processing device according to Embodiment 3.

FIG. 7 illustrates the state in which an NFC terminal 100 is placed on an information processing device 2 according to the present embodiment. The information processing device 2 is different from the information processing device 1 in that a display device 50a is provided instead of the display device 50. The display device 50a is different from the display device 50 in that a communication unit 52a is provided instead of the communication unit 52. The communication unit 52a is different from the communication unit 52 in that two NFC antennas 521 and 522 (a first antenna and a second antenna) are provided.

As illustrated in FIG. 7, in the information processing device 2, a communication-enabling region B2a and a communication-enabling region B2b (reception-enabling regions) are present that are respectively associated with the NFC antenna 521 and with the NFC antenna 522. In a case where the two NFC antennas 521 and 522 are each assigned the same use in the information processing device 2 described above, the communication-enabling regions B2a and B2b can be regarded as a single communication-enabling region B2.

In this case, for the distance D1 between the outer edge of the communication-enabling region B2 and the outer edge of the guide region Ai, the distance determination unit 12 (see FIG. 1) may choose any distance in a range of (i) the same lower limit as the lower limit described in Embodiment 1 to (ii) the same upper limit as the upper limit described in Embodiment 2.

It should be noted that, even if three or more NFC antennas are provided, communication-enabling regions can be regarded as a single region in a case where all of the antennas are each assigned the same use. Accordingly, for the distance D1, the distance determination unit 12 is able to choose any distance in a range of the upper limit described above to the lower limit described above.

Embodiment 4

Descriptions of Embodiment 4 of the present disclosure with reference to FIG. 8 will be as follows.

Figure 8:
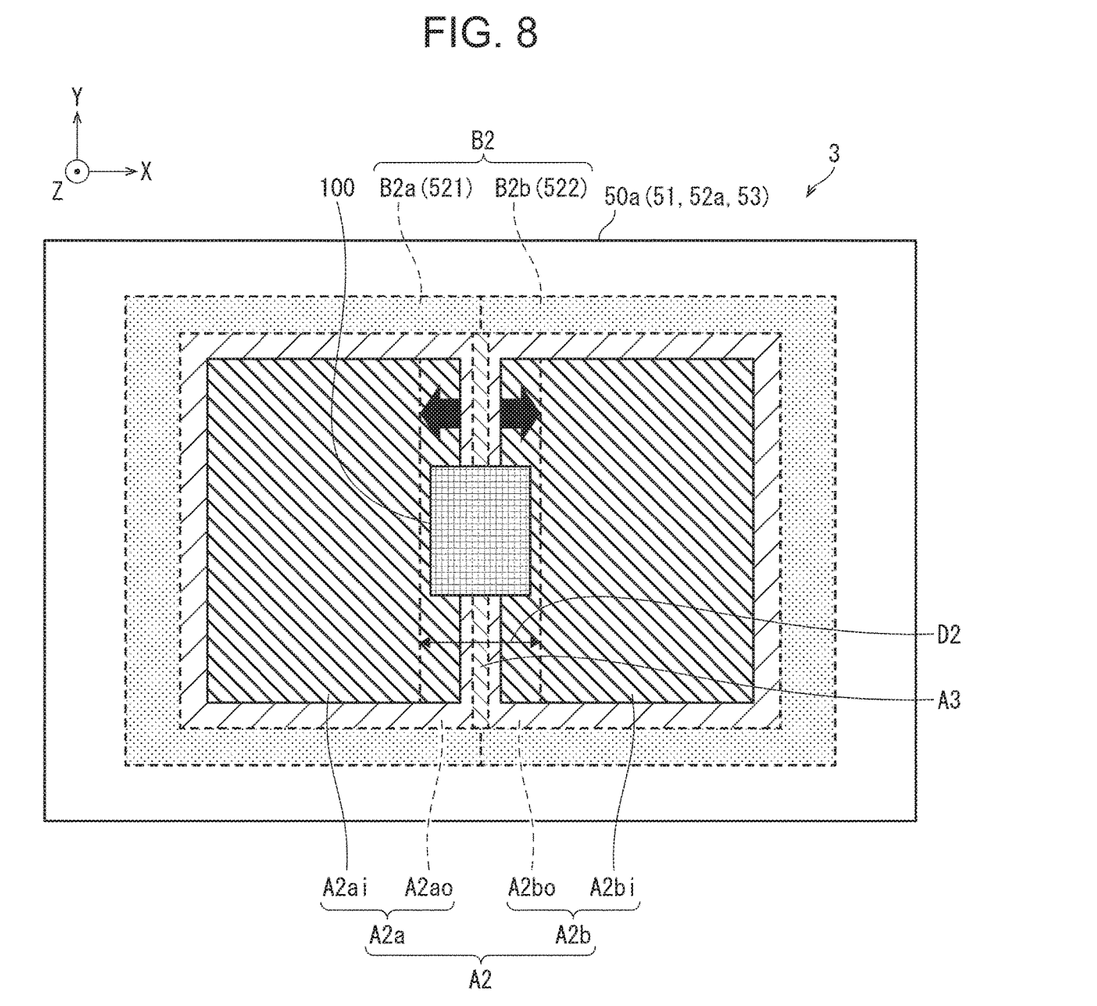
FIG. 8 illustrates a state in which an NFC terminal is placed on an information processing device according to Embodiment 4.

FIG. 8 illustrates the state in which an NFC terminal 100 is placed on an information processing device 3 according to the present embodiment. The information processing device 3 has configurations similar to the configurations of the information processing device 2 but differs from the information processing device 2 in that the two NFC antennas 521 and 522 are assigned respective different uses. Thus, in the information processing device 3, a guide region A2ai and a guide region A2bi are individually present for the communication-enabling region B2a and the communication-enabling region B2b, respectively. In addition, an error region A2ao and an error region A2bo are individually present for the communication-enabling region B2a and the communication-enabling region B2b, respectively.

In the information processing device 3, when an NFC terminal 100 is placed in a combined communication-accepting region A2 composed of the guide regions A2ai and A2bi and the error regions A2ao and A2bo, communication is performed between the NFC terminal 100 and one of the NFC antennas 521 and 522 included in the information processing device 3. Specifically, the NFC terminal 100 performs communication with the NFC antenna 521 or 522 depending on whether the NFC terminal 100 is placed (i) in a communication-accepting region A2a composed of the guide region A2ai and the error region A2ao or (ii) in a communication-accepting region A2b composed of the guide region A2bi and the error region A2bo.

Consider a case where the outer edge of the guide region A2ai and the outer edge of the guide region A2bi are close to each other (depicted by solid lines in FIG. 8) in the information processing device 3. In this case, even though the guide region A2ai and the guide region A2bi, which are visible to a user do not overlap each other, it is possible that there is present an overlapped error region A3 corresponding to a region where the error region A2ao and the error region A2bo, which are not visible to the user, partially overlap each other. Thus, in a case where an error occurs in the position at which the user places an NFC terminal 100, resulting in the NFC terminal 100 being placed in the overlapped error region A3, it is possible that communication is performed between the NFC terminal 100 and an NFC antenna, the NFC antenna 521 or the NFC antenna 522, that is not intended by the user.

In view of what described above, in the information processing device 3, a distance D2 that is determined on the basis of the length of an NFC terminal 100 is set between the guide region A2*ai* and the guide region A2*bi*, which are respectively associated with the NFC antenna 521 and with the NFC antenna 522. Specifically, there is set, between the guide region A2*ai* and the guide region A2*bi*, a distance that causes the error region A2*ao* and the error region A2*bo* not to overlap each other.

For example, as is in Embodiment 1, consider a case where an acceptable margin for error is set to half the average value C of the length of NFC terminals 100. In this case, first, the distance determination unit 12 calculates the average value C in the same way as in Embodiment 1. Next, the distance determination unit 12 determines whether or not the error region A2*ao* and the error region A2*bo* overlap each other when the guide regions A2*ai* and A2*bi* are displayed in accordance with the calculated average value C. In a case where the error region A2*ao* and the error region A2*bo* do not overlap each other, the distance determination unit 12 does not change the distance between the guide region A2*ai* and the guide region A2*bi*.

On the other hand, in a case where the error region A2*ao* and the error region A2*bo* overlap each other, the distance determination unit 12 sets the distance D2 between the guide region A2*ai* and the guide region A2*bi* so that the error region A2*ao* and the error region A2*bo* do not overlap each other. In this example, it is sufficient to choose the distance D2 to be twice as large as half (½) the average value C or more, in other words, to be equal to the average value C or more, in order to cause the error region A2*ao* and the error region A2*bo* not to overlap each other. Setting the distance D2 to such a value changes the position of a side of the guide region A2*ai* and the position of a side of the guide region A2*bi*, specifically, these sides facing each other, to positions that are separate from each other, as shown by thick black arrows, solid lines, and broken lines in FIG. 8.

In the information processing device 3, for the plural NFC antennas 521 and 522, the distance D2 is set between the guide region A2*ai* and the guide region A2*bi* so that the error region A2*ao* and the error region A2*bo*, which are respectively associated with the NFC antenna 521 and with the NFC antenna 522, do not overlap each other. As a result, the risk of performing communication that a user does not intend to perform is reduced.

As another example, in a case where the information processing device 3 includes three or more NFC antennas, the distance determination unit 12 may determine the distance D2 for each pair of adjacent NFC antennas so that error regions do not overlap each other.

It should be noted that, to reduce the risk of performing the communication that a user does not intend to perform, the distance between the NFC antennas may be increased without performing the method described above or in conjunction with performing the method described above.

Example of Realization with Software

The control block (especially, the controller 10) of each of the information processing devices 1, 1*v*, 2, and 3 may be composed of a logic circuit (hardware) formed in, for example, an integrated circuit (IC chip), or may be configured with software by using a central processing unit (CPU).

In the case of using software, each of the information processing devices 1, 1*v*, 2, and 3 includes: for example, a CPU, which runs the instructions of a program corresponding to software for realizing various functions; read-only memory (ROM) or a storage device (collectively referred to as a recording medium) where the program and various types of data are stored in a computer-readable (or CPU-readable) format; and random access memory (RAM) into which the program is decompressed, and the computer (in other words, the CPU) reads the program from the recording medium to run the program. In this way, the purpose of an aspect of the present disclosure is achieved. A tangible non-transitory medium, such as tape, a disk, a card, a semiconductor memory, and a programmable logic circuit, may be used as the recording medium. As another example, the program may be supplied to the computer through any transmission medium (such as a communication network and a broadcast wave) that is able to transmit the program. It should be noted that, as an alternative, an aspect of the present disclosure may be realized by using the form of data signals that are embedded in a carrier wave and into which the program is embodied through electronic transmission.

CONCLUSION

An information processing device (e.g., 1) according to Aspect 1 of the present disclosure includes: an antenna (NFC antenna 520) configured to perform near field communication with an information-communication terminal (NFC terminal 100); and a display unit (53) disposed so as to overlap the antenna. Here, the display unit is configured to display a guide region (e.g., Ai). The guide region serves as a guide for a reception-enabling region (e.g., a communication-enabling region B). The reception-enabling region corresponds to a region where the antenna is able to receive a signal from the information-communication terminal. The display unit is further configured to display the guide region such that the guide region is included in the reception-enabling region and the guide region is smaller than the reception-enabling region.

According to the configuration described above, the display unit displays the guide region, which serves as the guide for the reception-enabling region, such that the guide region is included in the reception-enabling region and the guide region is smaller than the reception-enabling region. When an information-communication terminal is placed inside the guide region, the information-communication terminal is reliably placed inside the reception-enabling region. Accordingly, the information processing device is able to guide, with a simple configuration, a user so that near field communication is performed.

In Aspect 2 of the present disclosure, the information processing device according to Aspect 1 may be configured such that the distance (D1) between the outer edge of the reception-enabling region and the outer edge of the guide region is determined on the basis of the length of the information-communication terminal.

According to the configuration described above, since the distance between the outer edge of the reception-enabling region and the outer edge of the guide region is determined on the basis of the length of the information-communication terminal, the distance is appropriately determined.

In Aspect 3 of the present disclosure, the information processing device according to Aspect 2 may be configured such that the distance is equal to half the length of a long axis or to half the length of a short axis of the information-communication terminal.

According to the configuration described above, when a half portion of the information-communication terminal is placed in a region outside the guide region, near field communication is enabled between the information-communication terminal and the antenna.

In Aspect 4 of the present disclosure, the information processing device according to Aspect 2 or 3 may be configured such that the upper limit of the distance is determined in accordance with the length of a long axis or of the length of a short axis of the information-communication terminal.

With a guide region smaller than the communication-enabling region, unintended communication might be performed when an information-communication terminal is placed in a region other than a region that is displayed as the guide region on the display unit. According to the configuration described above, the risk of performing the unintended communication described above is reduced by setting the upper limit of the distance between the outer edge of the reception-enabling region and the outer edge of the guide region, in other words, by setting the lower limit of the size of the guide region.

In Aspect 5 of the present disclosure, the information processing device according to any one of Aspect 2 to Aspect 4 may further include a distance determination unit (12) configured to determine the distance on the basis of the size of the information-communication terminal that has performed near field communication with the antenna.

According to the configuration described above, the distance determination unit included in the information processing device is able to determine the distance between the outer edge of the reception-enabling region and the outer edge of the guide region on the basis of the size of the information-communication terminal that has performed the communication with the antenna.

In Aspect 6 of the present disclosure, the information processing device according to Aspect 5 may be configured such that the distance determination unit determines the distance on the basis of history that includes: a size of an information-communication terminal with which the antenna has performed near field communication; and an occurrence rate at which the antenna has performed the near field communication with the information-communication terminal.

According to the configuration described above, even if information-communication terminals that perform near field communication with the antenna are of plural types, the distance between the outer edge of the reception-enabling region and the outer edge of the guide region is determined on the basis of the history that includes: the size of the information-communication terminal with which the antenna has performed near field communication; and the occurrence rate at which the antenna has performed the near field communication with the information-communication terminal.

In Aspect 7 of the present disclosure, the information processing device according to any one of Aspect 2 to Aspect 6 may be configured such that a first antenna (NFC antenna 521) and a second antenna (NFC antenna 522) are provided as the antenna and there is set, between a guide region for the first antenna and a guide region for the second antenna, a distance (D2) that is determined on the basis of the length of the information-communication terminal.

According to the configuration described above, the distance, which is determined on the basis of the length of the information-communication terminal, is set between the guide region for the first antenna and the guide region for the second antenna. As a result, even if an information-communication terminal is placed such that a portion thereof lies outside one of the guide regions, a risk is reduced that an antenna other than an antenna intended by the user and this information-communication terminal perform communication.

According to Aspect 8 of the present disclosure, there is provided a control method for an information processing device (e.g., 1) that includes: an antenna (NFC antenna 520) configured to perform near field communication with an information-communication terminal (NFC terminal 100); and a display unit (53) disposed so as to overlap the antenna. Here, the display unit is configured to display a guide region (e.g., Ai). The guide region serves as a guide for a reception-enabling region (e.g., a communication-enabling region B). The reception-enabling region corresponds to a region where the antenna is able to receive a signal from the information-communication terminal. The control method includes a guide-region display step for displaying the guide region on the display unit such that the guide region is included in the reception-enabling region and the guide region is smaller than the reception-enabling region.

The configuration described above provides the same effects as the effects provided by Aspect 1.

APPENDIX

The present disclosure should not be limited to the various embodiments described above and various modifications may be made within the scope of the aspects of the disclosure. Accordingly, the technical scope of an aspect of the present disclosure covers embodiments that are obtained by optionally combining techniques with one another that are disclosed in respective different embodiments. Moreover, combining the techniques with one another, which are disclosed in the respective embodiments, may form new technical features.

CROSS-REFERENCE TO RELATED APPLICATION

The present disclosure claims priority from Japanese Patent Application JP 2016-243699 filed in the Japan Patent Office on Dec. 15, 2016, the entire contents of which are hereby incorporated by reference.

Other Explanations of Present Disclosure

It should be noted that the aspects of the present disclosure may as well be explained as follows.

Specifically, an information processing device according to an aspect of the present disclosure includes an antenna configured to perform near field communication with an information-communication terminal, a display unit that overlaps the antenna, and a controller configured to control the antenna and the display unit. The controller displays a guide region in a range in the display unit, the range being smaller than a communication-enabling region associated with the antenna.

Moreover, in the information processing device according to the aspect of the present disclosure, the upper limit of the range of the guide region is determined on the basis of the communication-enabling region.

Moreover, in the information processing device according to the aspect of the present disclosure, the upper limit of the guide region is set to a region that has shrunk from each side of the communication-enabling region by a first predetermined length based on the size of the information-communication terminal.

Moreover, in the information processing device according to the aspect of the present disclosure, the first predetermined length is equal to half the length of the size of the information-communication terminal.

Moreover, in the information processing device according to the aspect of the present disclosure, the lower limit of the range of the guide region is determined on the basis of the communication-enabling region.

Moreover, in the information processing device according to the aspect of the present disclosure, the lower limit of the guide region is set to a region that has shrunk from each side of the communication-enabling region by a second predetermined length based on the size of the information-communication terminal. Here, note that the second predetermined length is larger than the first predetermined length.

Moreover, in the information processing device according to the aspect of the present disclosure, the second predetermined length is equal to the length of the size of the information-communication terminal.

Moreover, in the information processing device according to the aspect of the present disclosure, the size of the information-communication terminal is determined on the basis of the sizes of plural types of information terminals to be used in conjunction with the information processing device.

REFERENCE SIGNS LIST 1, 1v, 2, 3 Information processing device
12 Distance determination unit
53 Display unit
100 NFC terminal (Information-communication terminal)
520 NFC antenna (Antenna)
521 NFC antenna (First antenna)
522 NFC antenna (Second antenna)
Ai, A2ai, A2bi Guide region
B, B2a, B2b Communication-enabling region (Reception-enabling region)
D1, D2 Distance

The invention claimed is:

1. An information processing device comprising:
an antenna configured to perform near field communication with an information-communication terminal;
a distance determination unit; and
a display unit disposed so as to overlap the antenna and configured to display a guide region serving as a guide for a reception-enabling region, the reception-enabling region corresponding to a region where the antenna is able to receive a signal from the information-communication terminal, wherein
the display unit is further configured to display the guide region such that the guide region is included in the reception-enabling region and the guide region is smaller than the reception-enabling region;
wherein a distance between an outer edge of the reception-enabling region and an outer edge of the guide region is determined in accordance with a length of the information-communication terminal;
wherein the distance determination unit is configured to determine the distance in accordance with a size of the information-communication terminal that has performed near field communication with the antenna; and
wherein the distance determination unit determines the distance in accordance with history that includes a size of an information-communication terminal with which the antenna has performed near field communication, and an occurrence rate at which the antenna has performed the near field communication with the information-communication terminal.

2. The information processing device according to claim 1, wherein
the distance is equal to half a length of a long axis or to half a length of a short axis of the information-communication terminal.

3. The information processing device according to claim 1, wherein
an upper limit of the distance is determined in accordance with a length of a long axis or on a length of a short axis of the information-communication terminal.

4. The information processing device according to claim 1, wherein
a first antenna and a second antenna are provided as the antenna, and
a distance is set between a guide region for the first antenna and a guide region for the second antenna, the distance being determined in accordance with the length of the information-communication terminal.

* * * * *